(12) United States Patent
Avella et al.

(10) Patent No.: US 12,338,332 B2
(45) Date of Patent: Jun. 24, 2025

(54) POLYURETHANE SYNTHESIS

(71) Applicant: Avery Dennison Corporation, Mentor, OH (US)

(72) Inventors: Nicola Avella, Oegstgeest (NL); David G. Bland, Concord, OH (US); Danny G. Hartinger, Centre Hall, PA (US); Kyle R. Heimbach, Millmont, PA (US); Ranjit Malik, Port Matilda, PA (US)

(73) Assignee: Avery Dennison Corporation, Mentor, OH (US)

( * ) Notice: Subject to any disclaimer, the term of this patent is extended or adjusted under 35 U.S.C. 154(b) by 895 days.

(21) Appl. No.: 17/430,649

(22) PCT Filed: Feb. 11, 2020

(86) PCT No.: PCT/US2020/017646
§ 371 (c)(1),
(2) Date: Aug. 12, 2021

(87) PCT Pub. No.: WO2020/167757
PCT Pub. Date: Aug. 20, 2020

(65) Prior Publication Data
US 2022/0185973 A1 Jun. 16, 2022

Related U.S. Application Data

(60) Provisional application No. 62/806,067, filed on Feb. 15, 2019.

(51) Int. Cl.
*C08G 18/10* (2006.01)
*C08G 18/28* (2006.01)
(Continued)

(52) U.S. Cl.
CPC .............. *C08J 5/18* (2013.01); *C08G 18/10* (2013.01); *C08G 18/2825* (2013.01);
(Continued)

(58) Field of Classification Search
CPC . C08J 5/18; C08J 3/24; C08J 2375/04; C08G 18/10; C08G 18/2825;
(Continued)

(56) References Cited

U.S. PATENT DOCUMENTS 4,155,892 A 5/1979 Emmons et al.
5,264,532 A 11/1993 Bernard
(Continued)

FOREIGN PATENT DOCUMENTS

CN 102459384 5/2012
CN 102460867 5/2012
(Continued)

OTHER PUBLICATIONS

"Adhesion Principle, Technologies, and Application," South China University of Technology Press, ISBN 978-7-5623-3872-7, 1st Edition, Jan. 2014, p. 174.
(Continued)

*Primary Examiner* — Callie E Shosho
*Assistant Examiner* — Steven A Rice

(57) ABSTRACT

A method is disclosed for producing a polyurethane film including the steps of depositing a prepolymer composition, drying the prepolymer composition, and crosslinking the propolymer composition.

12 Claims, 14 Drawing Sheets

(51) Int. Cl.
  *C08G 18/34* (2006.01)
  *C08G 18/44* (2006.01)
  *C08G 18/72* (2006.01)
  *C08G 18/75* (2006.01)
  *C08J 3/24* (2006.01)
  *C08J 5/18* (2006.01)
  *C08K 5/17* (2006.01)
  *C08K 5/3412* (2006.01)
  *C08L 75/04* (2006.01)

(52) U.S. Cl.
  CPC ........... *C08G 18/348* (2013.01); *C08G 18/44* (2013.01); *C08G 18/722* (2013.01); *C08G 18/755* (2013.01); *C08G 18/758* (2013.01); *C08J 3/24* (2013.01); *C08K 5/17* (2013.01); *C08K 5/3412* (2013.01); *C08L 75/04* (2013.01); *C08J 2375/04* (2013.01); *C08L 2203/16* (2013.01)

(58) Field of Classification Search
  CPC .... C08G 18/348; C08G 18/44; C08G 18/722; C08G 18/755; C08G 18/758; C08G 18/0823; C08G 18/833; C08K 5/17; C08K 5/3412; C08L 75/04; C08L 2203/16; B32B 27/08; B32B 2307/712; B32B 2307/756; B32B 2307/762; C09J 2203/334; C09J 2301/302; C09J 2475/006; C09J 7/25; C09J 7/29
  USPC ...................................... 428/423.1
  See application file for complete search history.

(56) References Cited

U.S. PATENT DOCUMENTS

| | | | |
|---|---|---|---|
| 5,567,761 A | 10/1996 | Song | |
| 6,106,950 A * | 8/2000 | Searle | C08J 7/043 |
| | | | 427/372.2 |
| 10,253,209 B2 | 4/2019 | Fuchs | |
| 2003/0088045 A1* | 5/2003 | Haberle | C08G 18/44 |
| | | | 528/44 |
| 2004/0087713 A1* | 5/2004 | Fujii | C09D 155/005 |
| | | | 524/556 |
| 2005/0288430 A1 | 12/2005 | Gindin et al. | |
| 2009/0133905 A1 | 5/2009 | Kimura et al. | |
| 2012/0099231 A1 | 4/2012 | Ishihara et al. | |
| 2012/0103516 A1 | 5/2012 | Gentschev et al. | |
| 2014/0295181 A1 | 10/2014 | Minomo et al. | |
| 2015/0051306 A1 | 2/2015 | Chen et al. | |
| 2017/0240688 A1 | 8/2017 | Kramer et al. | |
| 2017/0362371 A1* | 12/2017 | Bätzgen | C08G 18/718 |
| 2018/0030650 A1 | 2/2018 | Tetsul | |
| 2018/0312717 A1* | 11/2018 | Niu | D21H 19/60 |

FOREIGN PATENT DOCUMENTS

| | | |
|---|---|---|
| CN | 103998241 | 8/2014 |
| CN | 107001568 | 8/2017 |
| CN | 107208363 | 9/2017 |
| CN | 107709615 | 2/2018 |
| EP | 1397245 | 3/2004 |
| EP | 2445067 | 4/2012 |
| EP | 2799236 | 11/2014 |
| EP | 3266930 | 1/2018 |
| EP | 3315631 | 5/2018 |
| JP | 2007-100038 | 4/2007 |
| WO | 02/088209 | 11/2002 |
| WO | 2007/043536 | 4/2007 |

OTHER PUBLICATIONS

"Polyurethane Resins," Synthetic Leather Chemicals, China Light Industry Press, ISBN 978-7-5184-0844-3, 1st Edition, Jul. 2016, p. 31.

"Polymer Coatings," Synthetic Polymer Materials Science, Beijing Institute of Technology Press, ISBN 978-7-5682-6659-8, 1st Edition, Jan. 2019, pp. 251-254.

International Search Report and Written Opinion dated May 29, 2020 issued in corresponding IA No. PCT/US2020/017646 filed Feb. 11, 2020.

International Preliminary Report on Patentability dated Aug. 10, 2021 issued in corresponding IA No. PCT/US2020/017646 filed Feb. 11, 2020.

* cited by examiner and/or and/or

R1 = Any Moiety
R = Any Moiety

R₂ = Aziridine or Epoxy or
Carbodiimide or Oxazoline or
Hydroxyl

POLYURETHANE SYNTHESIS

CROSS-REFERENCE TO RELATED APPLICATIONS

The present application is a 371 of International Application No. PCT/US2020/017646, which was published in English on Aug. 20, 2020, and claims the benefit of U.S. Application No. 62/806,067 filed Feb. 15, 2019, both the entirety of which are incorporated herein by reference in their entireties.

FIELD OF THE INVENTION

The present subject matter relates to methods for producing polyurethanes, which are useful, inter alia, in graphic film applications, especially those that are PVC-free.

BACKGROUND OF THE INVENTION

Polyurethanes are typically formed by extrusion, water-based, UV, or solvent-based methods. Film manufacturing of multilayer structures may include processing routes such as extrusion, casting, coating, etc.

Extrusion processes may start from either preformed thermoplastic polyurethane resins or reactants used to form the polyurethane via reactive extrusion. However, expensive equipment is required and the extrusion processes lack versatility.

Casting of water-based or solvent-based compositions on a web may lead to enhanced versatility. However, there are also drawbacks. For example, water-based processes require surfactants, emulsifiers, and wetting agents, which can impact some properties (e.g., printability) of the final film. The final film may also be sensitive to water due to the wetting agent(s) and/or emulsifier(s). In solvent-based processes, the solvent(s) may be hazardous and/or environmentally-damaging. Additionally, high viscosity at low solid content impacts production speed.

A need remains for new polyurethane synthesis methods that yield polyurethane films with a good combination of properties. The invention is directed to these, as well as other important, needs.

SUMMARY OF THE INVENTION

Disclosed, in some embodiments, is a method for forming a polyurethane film. The method includes depositing a composition including a prepolymer onto a substrate and crosslinking the prepolymer. The prepolymer does not contain any isocyanate.

In some embodiments, the composition further includes a solvent. The crosslinking may at least partially occur simultaneously with drying of the solvent.

The prepolymer may include a plurality of carboxyl moieties and/or silane moieties. In some embodiments, the carboxyl and/or silane moieties are end groups.

The polyurethane may be an aliphatic polyurethane.

In some embodiments, the substrate is a facestock of an adhesive label. The adhesive label may further include an adhesive layer and a release liner.

A crosslinking agent may be included in or added to the composition. In some embodiments, the crosslinking agent is a polyaziridine compound.

Disclosed, in other embodiments, is a prepolymer useful for the synthesis of polyurethane films. The prepolymer includes carboxyl and/or silane groups in the absence of isocyanate groups, especially those from unreacted starting material.

Disclosed, in further embodiments, is a method for forming a prepolymer as described herein.

Disclosed, in further embodiments, is graphic film produced by a method as described herein.

These and other non-limiting aspects of the present disclosure are discussed further herein.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF THE INVENTION

Figure 1:
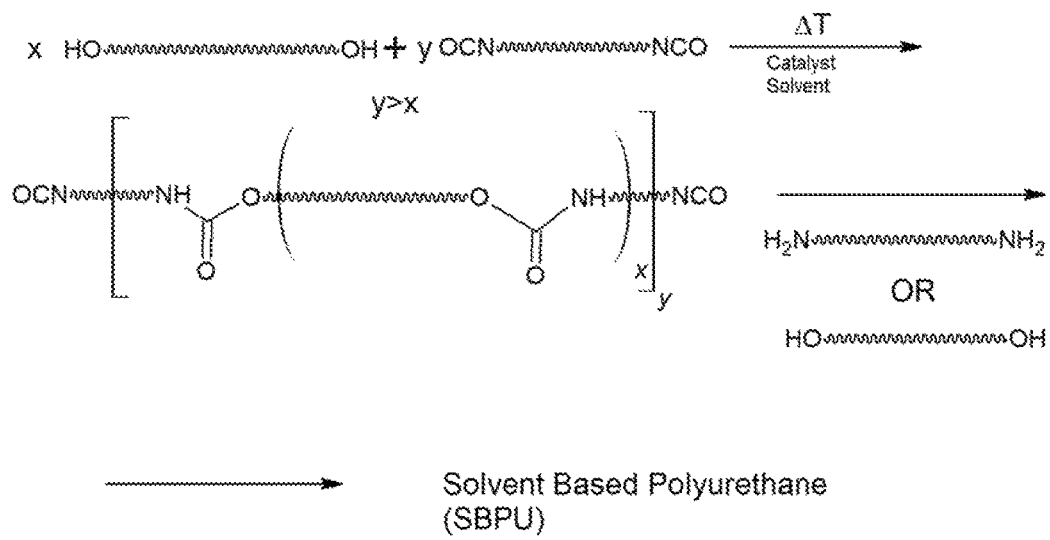
FIG. 1 illustrates some aspects of solvent-based polyurethane synthesis chemistry.
Figure 2:
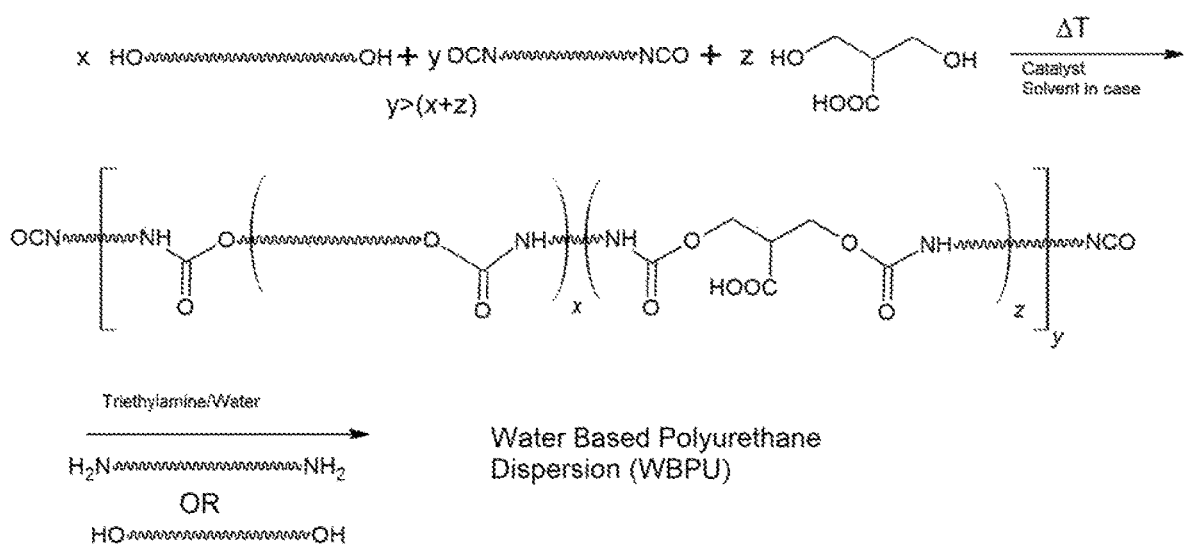
FIG. 2 illustrates some aspects of water-based polyurethane synthesis chemistry.
Figure 3:
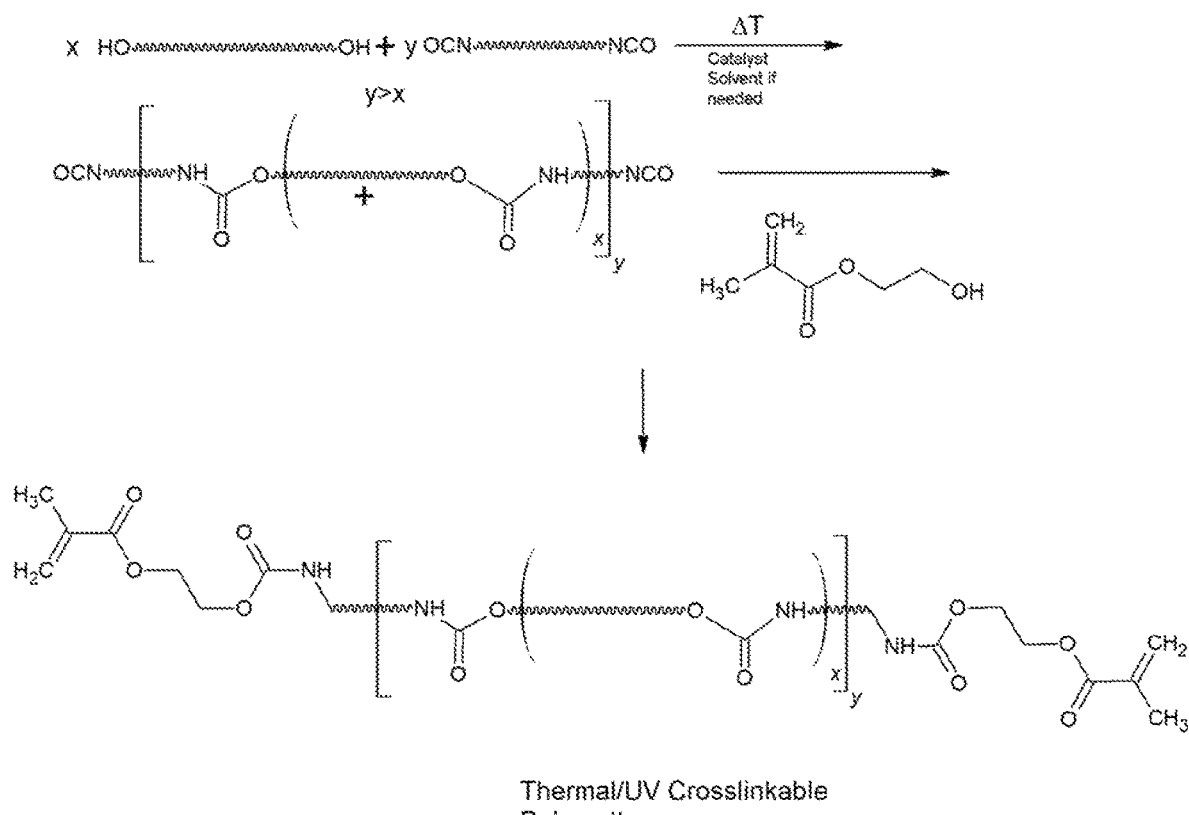
FIG. 3 illustrates some aspects of thermal/UV-crosslinked polyurethane synthesis chemistry.
Figure 4:
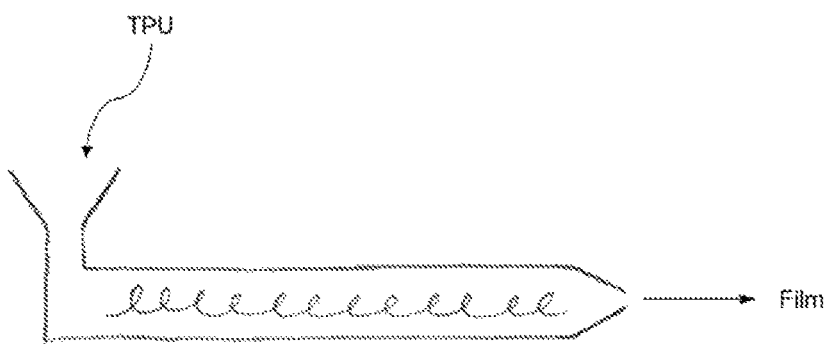
FIG. 4 illustrates some aspects of polyurethane synthesis chemistry using extrusion.
Figure 5:
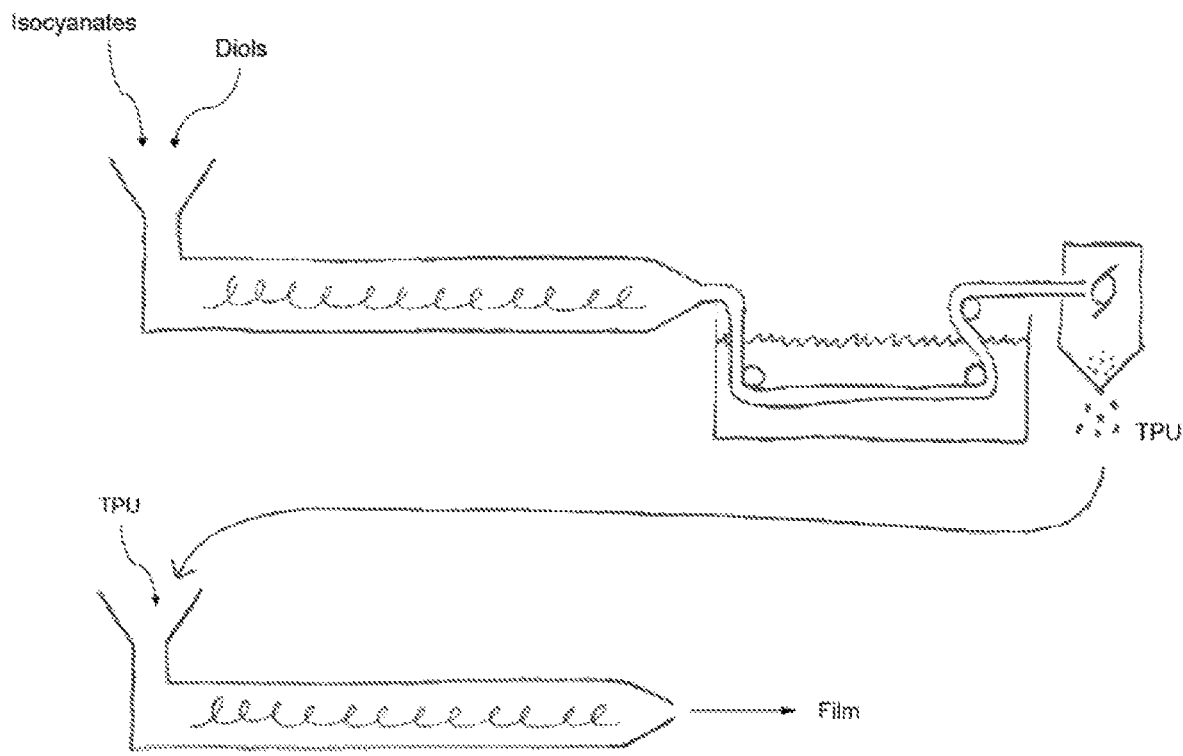
FIG. 5 illustrates some aspects of polyurethane synthesis chemistry using reactive extrusion.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Unless otherwise indicated, percentages disclosed for various materials refer to weight percentages (wt %).

As used herein, "pressure sensitive adhesive" or "PSA" refers to a material that may be identified by the Dahlquist criterion, which defines a pressure sensitive adhesive as an adhesive having a one second creep compliance of greater than $1 \times 10^{-6}$ cm$^2$/dyne as described in Handbook of PSA Technology, Donatas Satas (Ed.), $2^{nd}$ Edition, page 172, Van Nostrand Reinhold, New York, N.Y., 1989. Since modulus is, to a first approximation, the inverse of creep compliance, pressure sensitive adhesives may also be defined as adhesives having a Young's modulus of less than $1 \times 10^6$ dynes/cm$^2$. Another well-known means of identifying a pressure sensitive adhesive is an adhesive that it is aggressively and permanently tacky at room temperature and firmly adheres to a variety of dissimilar surfaces upon mere contact without the need of more than finger or hand pressure, and which may be removed from smooth surfaces without leaving a residue, as described in *Glossary of Terms Used in the Pressure Sensitive Tape Industry* provided by the Pressure Sensitive Tape Council, 1996. Another suitable definition of a suitable pressure sensitive adhesive is that it preferably has a room temperature storage modulus within the area defined by the following points as plotted on a graph of modulus versus frequency at 25° C.: a range of moduli from about $2 \times 10^5$ to $4 \times 10^5$ dynes/cm$^2$ at a frequency of about 0.1 radians/sec (0.017 Hz), and a range of moduli from about $2 \times 10^6$ to $8 \times 10^6$ dynes/cm$^2$ at a frequency of approximately 100 radians/sec (17 Hz). See, for example, Handbook of PSA Technology (Donatas Satas, Ed.), $2^{nd}$ Edition, page 173, Van Nostrand Rheinhold, N.Y., 1989. Any of these methods of identifying a pressure sensitive adhesive may be used to identify suitable pressure sensitive adhesives for use in the film constructions of the invention.

As used herein, a "glass transition temperature" or "$T_g$" of a copolymer refers to the glass transition temperature as calculated with the Fox equation [*Bulletin of the American Physical Society* 1, 3 Page 123 (1956)] as follows (wherein the copolymer contains two monomers):

$$1/T_g = w_1/T_{g1} + w_2/T_{g2}$$

For a copolymer, $w_1$ and $w_2$ refer to the weight fraction of the two comonomers, based on weight of monomers charged to the reaction vessel, and $T_{g1}$ and $T_{g2}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the $T_g$ of a particular homopolymer, in which case the $T_g$ of the homopolymer is measured by differential scanning calorimetry (DSC) at a heating rate of at a heating rate of 10° K/minute.

FIGS. 1-5 illustrate some general chemistry for solvent-based, water-based, UV-crosslinkable, extrusion, and reactive extrusion methods for producing polyurethane films. One, two, or more of the types of methods may be combined in accordance with some embodiments of the present disclosure.

The present disclosure relates to prepolymers that are useful for synthesizing polyurethanes, compositions containing the prepolymers, methods for making the prepolymers, methods for producing polyurethane films from the prepolymers, and products containing the films.

In some embodiments, the prepolymers do not contain isocyanates. Isocyanates can be irritants to the mucous membranes of eyes and the gastrointestinal and respiratory tracts. Isocyanates are also highly reactive. As used herein, "do not contain isocyanates" or contain no isocyanates refers to a composition containing less than 1% unreacted isocyanate reactant, preferably less than 0.5%, more preferably less than 0.25%, even more preferably less than 0.1%, and most preferably 0%. The level of unreacted isocyanate reactant may be measured by any suitable means, including the monitoring of the —N=C=O peak at 2230 $cm^{-1}$ by infrared (IR) spectroscopy or Fourier-transform infrared (FT-IR) spectroscopy.

The prepolymers of the present disclosure may contain carboxylic and/or silane groups to facilitate crosslinking.

In some embodiments, the prepolymer includes a plurality of carboxyl groups. The carboxyl groups may be end-groups. In some embodiments, the prepolymer does not contain carboxyl end-groups. In other embodiments, the prepolymer contains only carboxyl end-groups. In further embodiments, some but not all of the carboxyl groups are end-groups.

Figure 6:
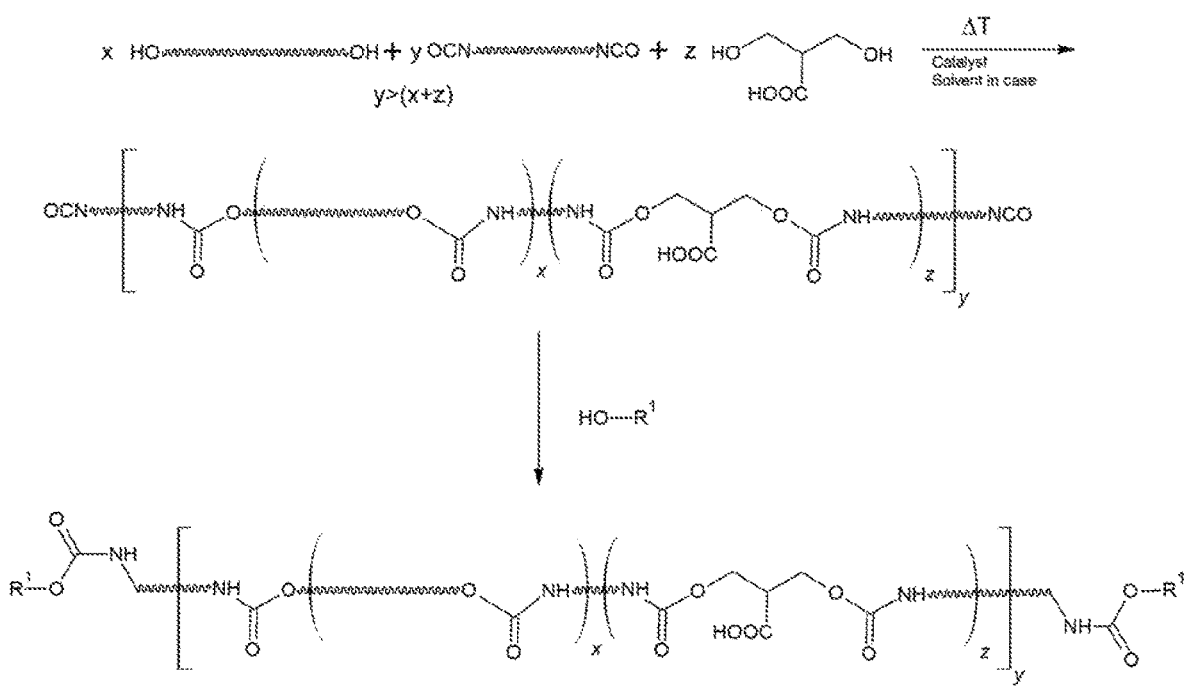
FIG. 6 illustrates a first non-limiting reaction path for producing a prepolymer with carboxyl groups in accordance with some embodiments of the present disclosure.

In some embodiments, the prepolymer is produced by reacting a diol or polyol, an isocyanate, and a hydroxyl-functional acid. Heat and/or a catalyst may be used. An alcohol, an amine, and or another compound may be added to react with isocyanate end-groups to form the prepolymer. FIG. 6 illustrates a non-limiting embodiment of a reaction path for the prepolymer formation.

In FIG. 6, —$R^1$ may be any monovalent moiety (with a single point of attachment) derived from a monofunctional alcohol, such as for example, a linear, branched, or cyclic alkyl, alkenyl, alkynyl, aryl, or heteroaryl, all of which are unsubstituted or substituted. In some embodiments, the equivalent ratio of NCO:OH is in the range of from about 1 to about 2. The isocyanate may have a weight-average molecular weight in the range of from about 200 to about 1,000. In some embodiments, the diol has a weight-average molecular weight in the range of from about 500 to about 4,000. In some embodiments, the equivalent ratio of diol:DMPA is in the range of about 1.01 to about 1.4. The equivalent ratio of endcapped OH:NCO prepolymer may be in the range of from about 1.01 to about 1.2.

Figure 7:
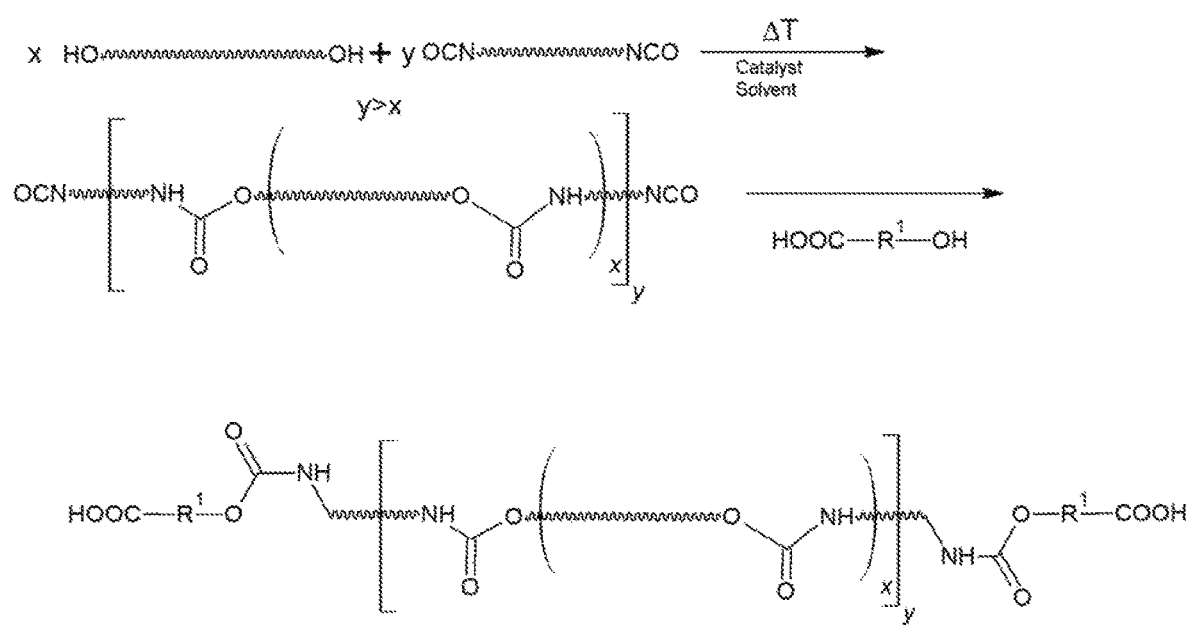
FIG. 7 illustrates a second non-limiting reaction path for producing a prepolymer with carboxyl groups in accordance with some embodiments of the present disclosure.

In some embodiments, the prepolymer is produced by reacting a diol or polyol with an isocyanate. A carboxyl-containing compound can be added to replace isocyanate end-groups with carboxyl end-groups. FIG. 7 illustrates a non-limiting embodiment of a reaction path for the prepolymer formation.

In FIG. 7, —$R^1$— may be any bivalent moiety (with two points of attachment) derived from a monofunctional alcohol, such as for example, a linear, branched, or cyclic alkylenyl, alkenylenyl, alkynylenenyl, arylenyl, or heteroarylenyl, all of which are unsubstituted or substituted. In some embodiments, the equivalent ratio of NCO:OH is in the range of from about 1 to about 2. The weight-average molecular weight of the isocyanate may be in the range of from about 200 to about 1,000. In some embodiments, the diol has a weight-average molecular weight in the range of from about 500 to about 4,000. The equivalent ratio of endcapped OH:NCO prepolymer may be in the range of from about 1.01 to about 1.2.

Figure 8:
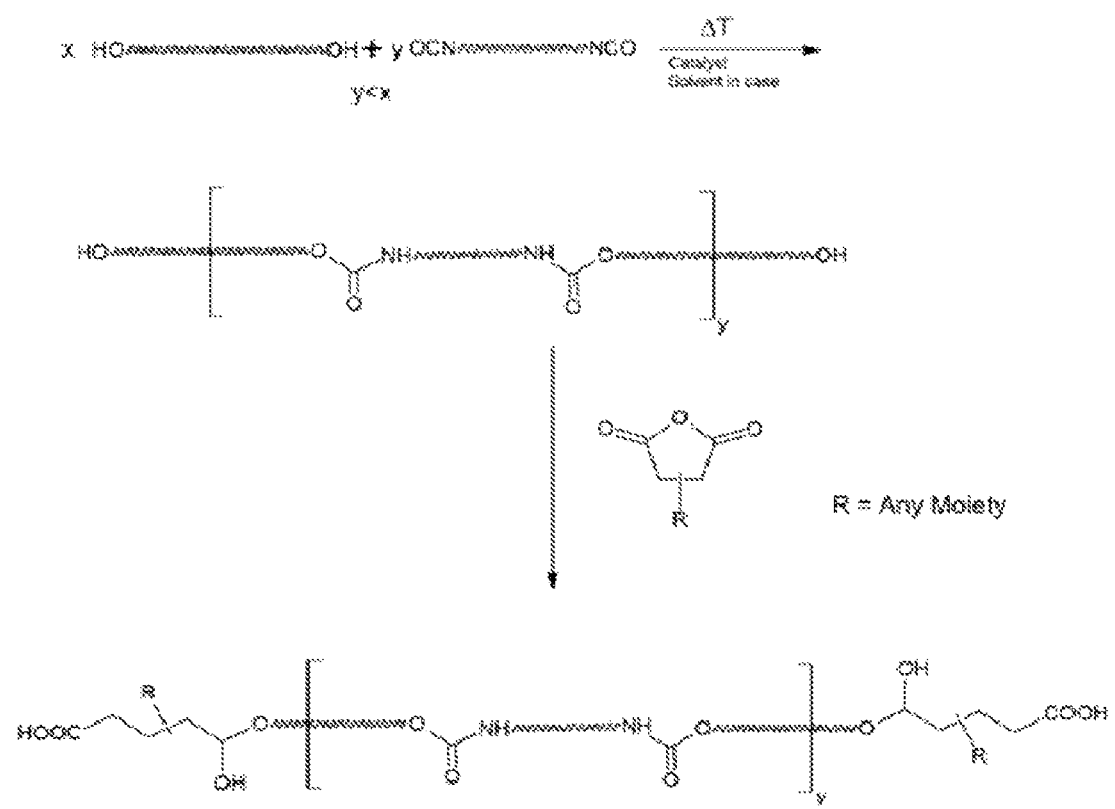
FIG. 8 illustrates a third non-limiting reaction path for producing a prepolymer with carboxyl groups in accordance with some embodiments of the present disclosure.

In some embodiments, an anhydride (e.g., an acid anhydride) is used. The anhydride may be an anhydride of succinic acid. FIG. 8 illustrates a non-limiting embodiment. In FIG. 8, R may be any moiety. In some embodiments, the equivalent ratio OH:NCO is in the range of from about 1 to about 2. The isocyanate may have a weight-average molecular weight in the range of from about 200 to about 1,000. In some embodiments, the diol has a weight-average molecular weight in the range of from about 100 to about 4,000. The equivalent ratio of anhydride:COOH may be in the range of from about 0.5 to about 1.5.

It should be understood that mixtures of two or more of the prepolymers of the present disclosure can be included in the same composition.

Figure 9:
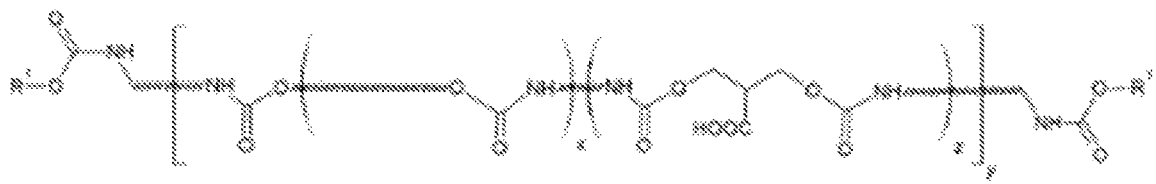
FIG. 9 illustrates a non-limiting embodiment of a crosslinking reaction.
Figure 9:
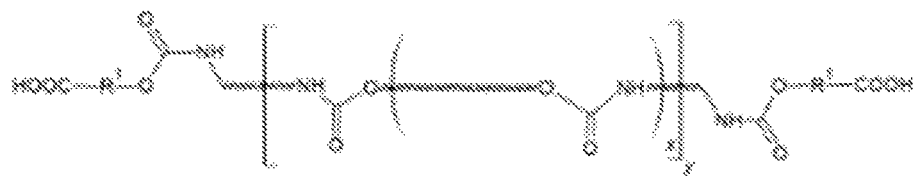
Figure 9:
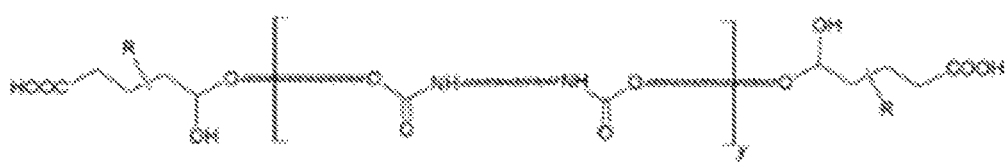
Figure 9:
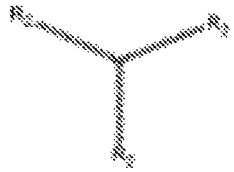
Figure 9:
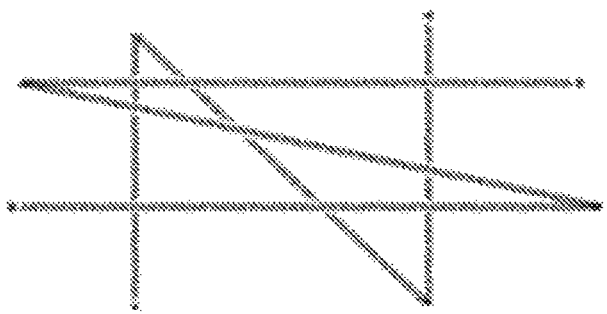

FIG. 9 illustrates a non-limiting embodiment of a cross-linking/chain extension reaction in accordance with some embodiments of the present disclosure. A crosslinking agent is used to form a bond between prepolymers. The equivalent ratio of COOH:crosslinker may be from about 25% to about 100%.

Figure 10:
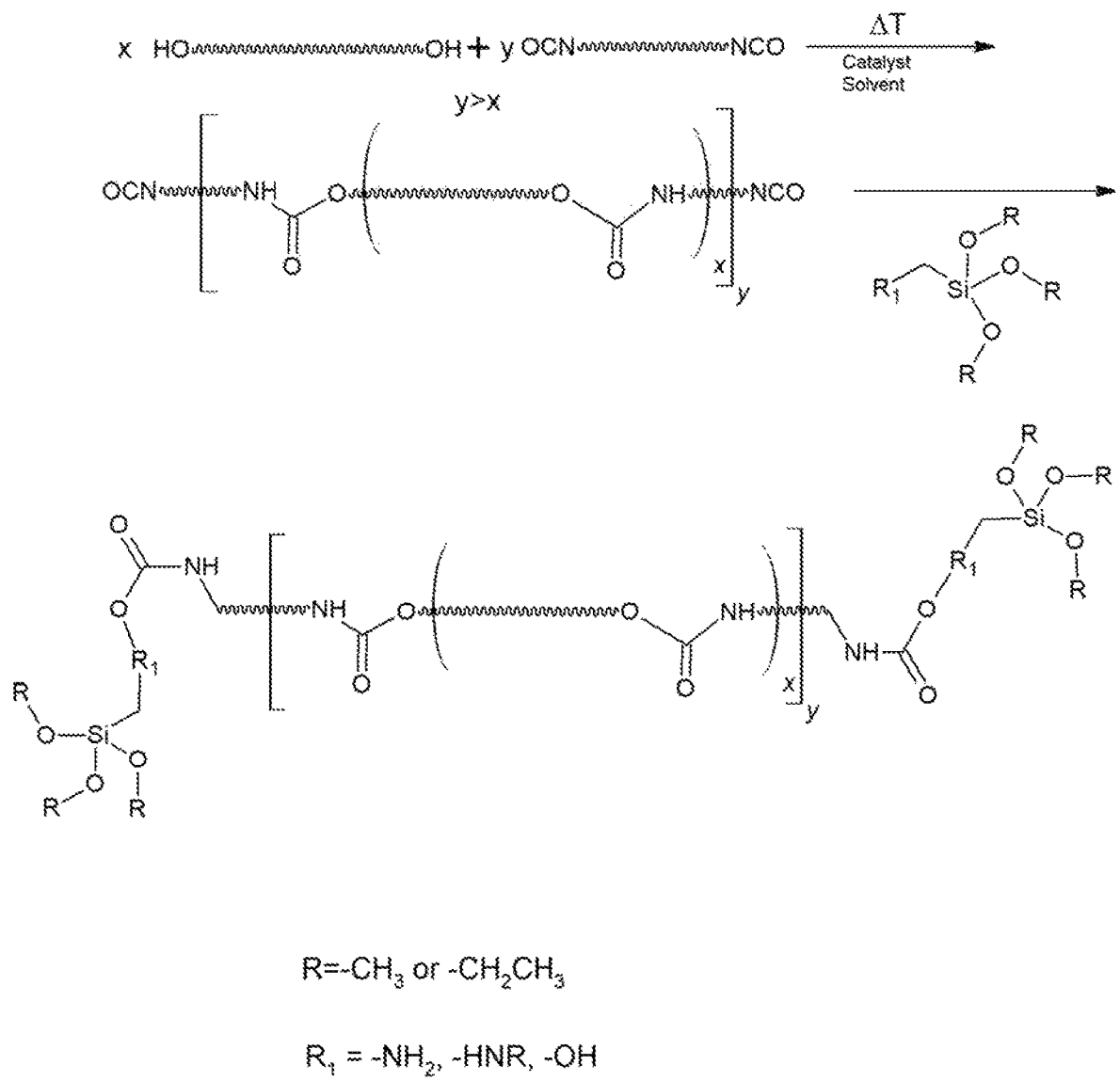
FIG. 10 illustrates a first non-limiting reaction path for producing a prepolymer with silane groups in accordance with some embodiments of the present disclosure.

FIG. 10 illustrates a first reaction path for forming a prepolymer with silane groups. R may be a moiety derived from a monofunctional alcohol. $R_1$ may be a moiety of a primary/secondary amino and/or a hydroxyl group. In some embodiments, an equivalent ratio of NCO:OH is in the range of from about 1 to about 2. The weight-average molecular weight of the isocyanate may be in the range of from about 200 to about 1,000. In some embodiments, the diol has a weight-average molecular weight in the range of from about 500 to about 4,000. In some embodiments, the equivalent ratio of the endcapper to the NCO prepolymer is in the range of from about 1 to about 1.2.

Figure 11:
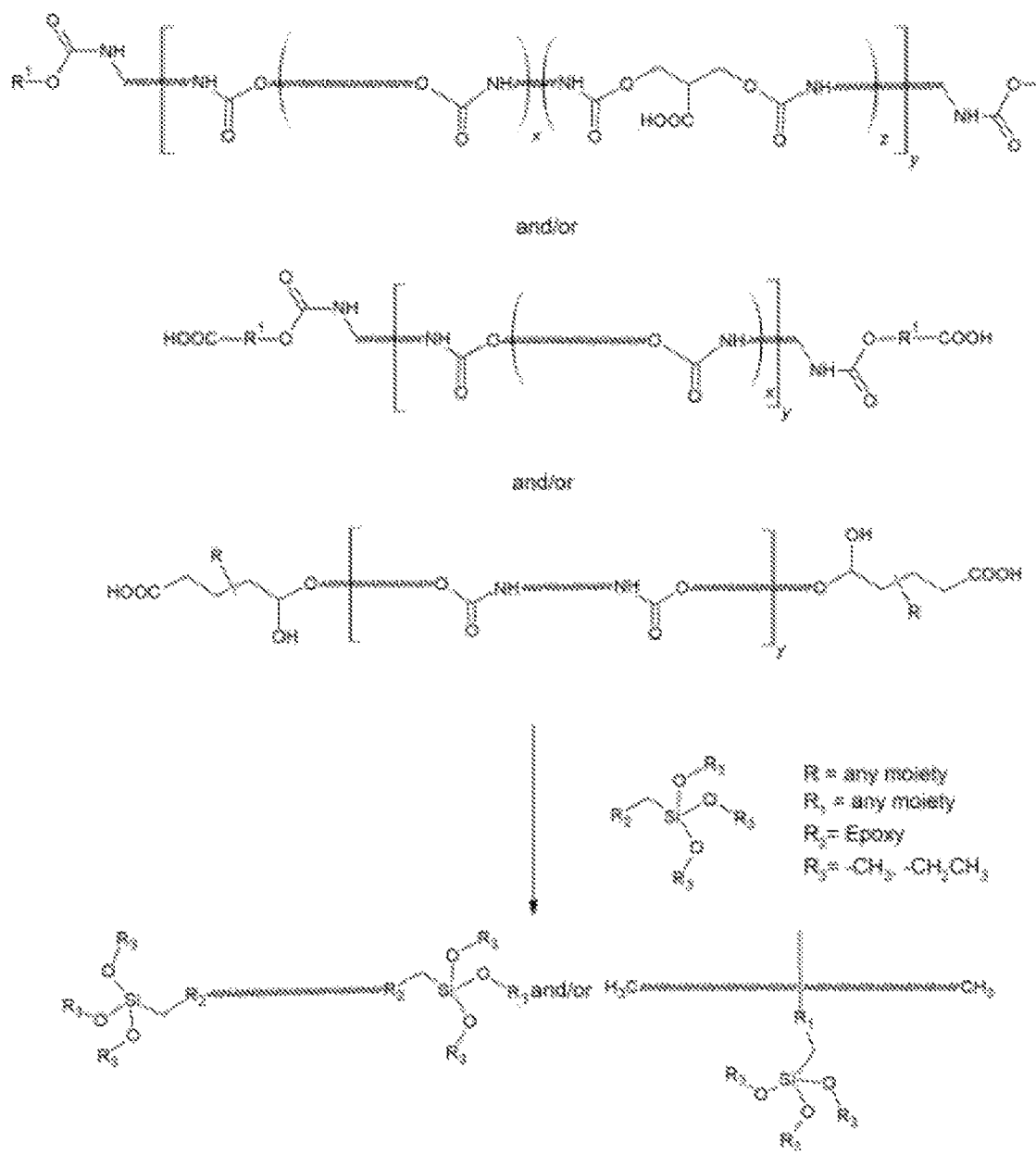
FIG. 11 illustrates a second non-limiting reaction path for producing a prepolymer with silane groups in accordance with some embodiments of the present disclosure.

FIG. 11 illustrates a second reaction path for forming a prepolymer with silane groups. R may be any monovalent moiety (with a single point of attachment) derived from a monofunctional alcohol, such as for example, a linear, branched, or cyclic alkyl, alkenyl, alkynyl, aryl, or heteroaryl, all of which are unsubstituted or substituted and $R^1$ may be any bivalent moiety (with two points of attachment) derived from a monofunctional alcohol, such as for example, a linear, branched, or cyclic alkylenyl, alkenylenyl, alkynylenenyl, arylenyl, or heteroarylenyl, all of which are unsubstituted or substituted. $R^2$ may be a moiety with an epoxy group. In some embodiments, an equivalent ratio of NCO:OH is in the range of from about 1 to about 2. The weight-average molecular weight of the isocyanate may be in the range of from about 200 to about 1,000. In some embodiments, the diol has a weight-average molecular weight in the range of from about 500 to about 4,000. In some embodiments, the equivalent ratio of the endcapper to the NCO prepolymer is in the range of from about 0.5 to about 1.2.

Figure 12:
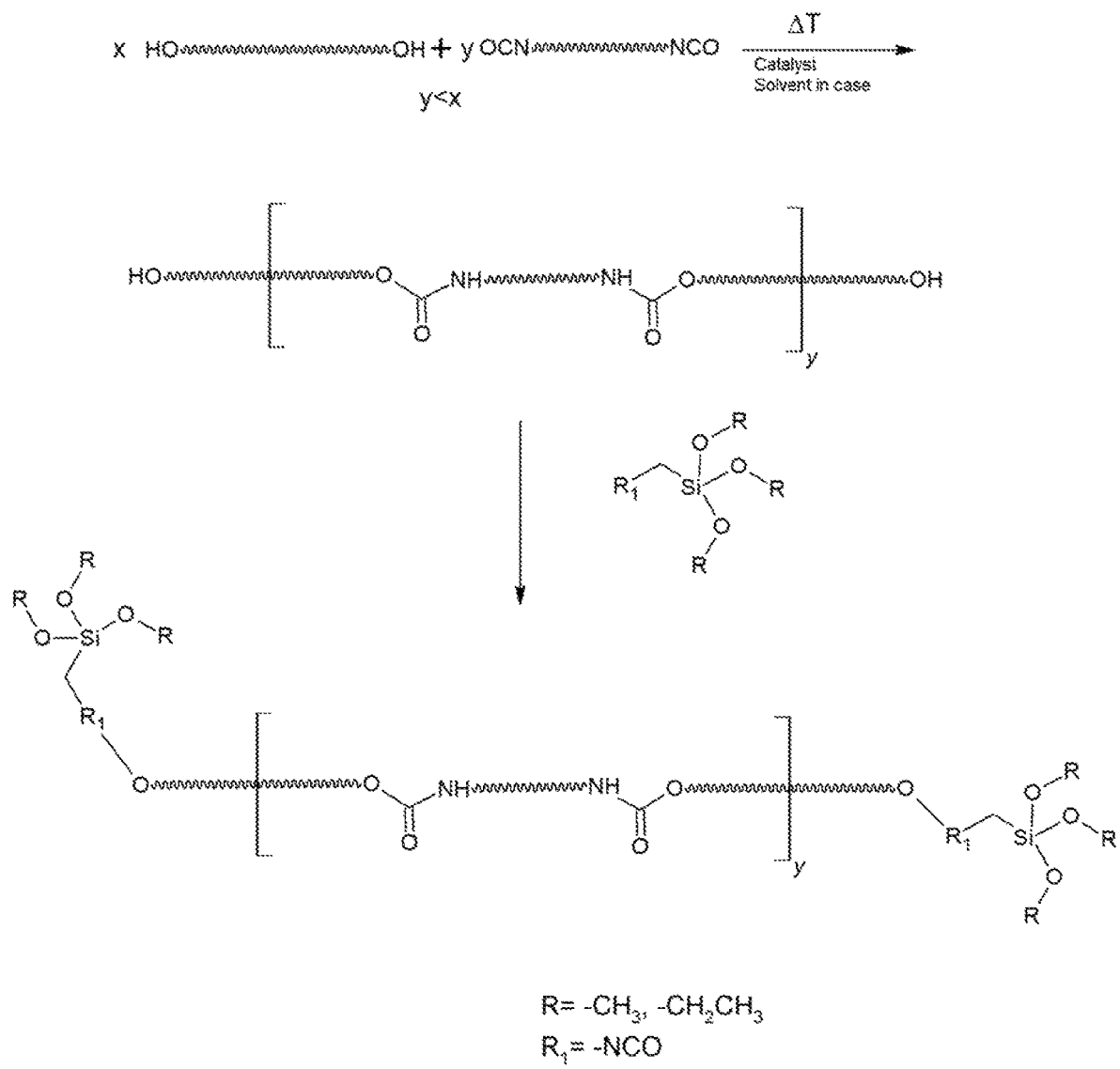
FIG. 12 illustrates a third non-limiting reaction path for producing a prepolymer with silane groups in accordance with some embodiments of the present disclosure.

FIG. 12 illustrates a third reaction path for forming a prepolymer with silane groups. R may be a moiety derived from a methyl and/or ethyl alcohol. In some embodiments, $R_1$ includes a NCO group. The equivalent ratio of NCO:OH may be in the range of from about 1 to about 2. The weight-average molecular weight of the isocyanate may be in the range of from about 200 to about 1,000. In some embodiments, the diol has a weight-average molecular weight in the range of from about 500 to about 4,000. In some embodiments, the equivalent ratio of the endcapper to the NCO prepolymer is in the range of from about 0.5 to about 1.2.

FIGS. 10-12 show different paths for adding silane groups to a prepolymer for producing a polyurethane.

Figure 13:
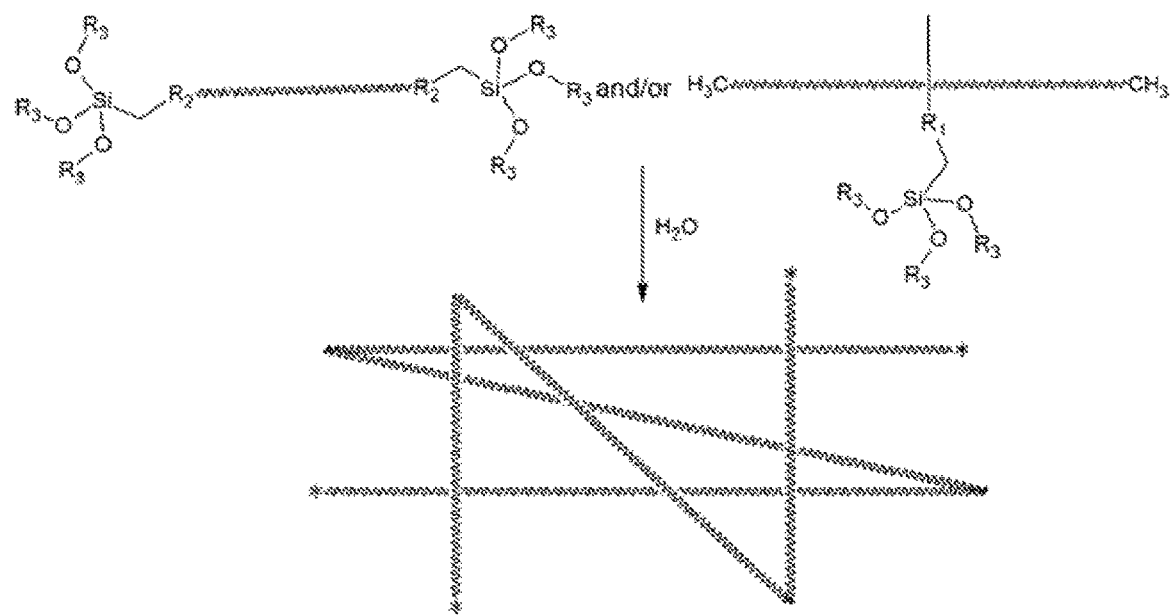
FIG. 13 illustrates a non-limiting embodiment of a crosslinking reaction.

FIG. 13 illustrates a crosslinking reaction in accordance with some embodiments of the present disclosure.

Non-limiting examples of diols and polyols that may be used in accordance with the present disclosure include Eternacoll (from UBE Industries Ltd.), low molecular weight 1,4-butanediol, 1,6-hexanediol, neopentyl glycol, 1,3-propanediol, 2,2-dimethyl-1,3-propanediol, 2-ethyl-2-butyl-1,3-propanediol, ethylene glycol, diethylene glycol, triethylene glycol, pentanediol, 3-methyl-1,5-pentanediol, hexane diol, octanediol, 1,4-butynediol, 1,4-butylene diol, diethylene glycol, triethylene glycol, dipropylene glycol, glycerol, trimethylolpropane, trimethylolethane, 1,2,6-hexanetriol; high molecular weight (from 500 to 4000) polycarbonate diols (Oxymer series from Pestorp or Kuraray polyol or Eternacoll), polycaprolactone diols (such as CAPA from Perstorp), polyester diols (such as K-flex from King Industries), polyether diols (such as Carpol from Carpenter), Polyacrylic diols (such as Joncryl from BASF), and any other OH functionalized polymer, including but not limited to Fluorolink from Solvay, Lumiflon from AGC, Dowsil from Dow Corning, and Exolit from Clariant.

Non-limiting examples of diamines that may be used in accordance with the present disclosure include low molecular weight ethylene diamine (Huntsman), hexamethylenediamine (Toray), propylamine, 3-aminomethyl-3,5,5-trimethylcyclohexylamine (Evonik), any other low molecular weight diamine, high molecular weight (from 500 to 4000 Daltons) polyether diamines (such as Jeffamine from Huntsman), and any other polymeric diamine.

Hybrids with —OH and —NH$_2$ functionality, such as ethanolamine, may be used for reacting with —NCO.

Non-limiting examples of hydroxyl-functionalized acids include monomeric or polymeric—COOH containing structures having one or more OH or NH$_2$ groups suitable to react with NCO include 3-hydroxy-2,2-dimethylpropanoic acid (from Sigma Aldrich or Alpha Aesar), dimethylol propionic acid (DMPA from Perstorp), and lactic acid.

Polymer functionalized with —COOH may include Fluorolink (from Solvay), Albester (from Sartomer), and polyacrylic acid (from Arkema, Dow).

Non-limiting examples of anhydrides include succinic anhydride, glutaric anhydride, pimelic anhydride, adipic anhydride, phthalic anhydride; maleic anhydride; trimellitic anhydride; tetrahydrophthalic anhydride; hexahydrophthalic anhydride; tetrachlorophthalic anhydride; adipic anhydride; azelaic anhydride; sebacic anhydride; malonic anhydride; suberic anhydride; 2,2-dimethylsuccinic anhydride; 3,3-dimethylglutaric anhydride; 2,2-dimethylglutaric anhydride; dodecenylsuccinic anhydride; nadic methyl anhydride; octenyl succinic anhydride, and HET anhydride.

Mono-functional end cappers that react with —NCO to stop chain extension may be used. Non-limiting examples include alcohols such as ethanol, propanol, 2-ethyl-hexyl alcohol and all short or polymeric monofunctional alcohols; and amines such as butylamine, propylamine, ethylamine and all short or polymeric monofunctional amines.

Non-limiting examples of isocyanates include aliphatic monomeric isocyanates, aliphatic polymeric isocyanates, aromatic monomeric isocyanates, and aromatic polymeric isocyanates.

The aliphatic monomeric isocyanates may be selected from hexamethylene diisocyanate, isophorone diisocyanate, H12MDI (from Evonik), 2,2,4- and 2,4,4-trimethyl hexamethylene diisocyanate.

The aliphatic polymeric isocyanate may be selected from Tolonate™ X FLO100 (Vencorez) and Vestanat (Evonik).

The aromatic monomeric isocyanate may be selected from toluene diisocyanate, methylene diphenyl diisocyanate, and tetramethylxylene diisocyanate.

In some embodiments, the isocyanate is selected from at least one of ethylene diisocyanate, 1,6-hexamethylene diisocyanate, isophorone diisocyanate, cyclohexane-1,4-diisocyanate, 4,4-dicyclohexylmethane diisocyanate, cyclopentylene diisocyanate, p-tetramethylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMO), and polymers thereof.

Non-limiting examples of crosslinkers include polyaziridines (e.g., from DSM or Menadiona), epoxies (e.g., Epikote and Epikure from Hexion), melamine formaldehyde, chelating agents (e.g., aluminum acetyl acetonate), and carbodiimides.

Non-limiting examples of catalysts include tin derivatives (e.g., DBTL from TIB Chemicals), bismuth derivatives (e.g., bismuth carboxylate from TIB Chemicals), and tertiary amine derivatives (e.g., from Momentive).

Non-limiting examples of solvents include ketones (e.g., acetone, MEK) and aromatics (e.g., toluene).

A ratio of Prepolymer COOH functionalized:Polymer COOH functionalized may be in the range of from about 100:0 to about 0:100.

For the silane-based method, non-limiting examples of materials that may be used include epoxy: Silquest A187, Silquest A1871 (Momentive), amino: Geniosil XL924 & 926 (Wacker Chemie), Silquest A1100, Silquest A1110, Silquest A1170 (Momentive), and isocyanate: Silquest A-link 25 and A-link 35 (Momentive).

Non-limiting examples of silanes include di- and tri-alkoxysilanes. In some embodiments, the silane(s) is/are selected from aminosilanes such as aminopropyltrimethoxysilane, aminopropyltriethoxysilane, aminopropyl-methyl-dimeth-oxysilane, aminopropyl-methyldiethoxysilane, N-(2-aminoethyl)aminopropyltrimethoxysilane, N-(2-aminoethyl)aminopropyltrimethoxysilane, N-(2-aminoethyl)aminopropyltriethoxysilane, N-(2-aminoethyl)aminopropylmethyldimethoxysilane, N-cyclohexylaminomethyltriethoxysilane, N-cyclohexylaminomethyl-methyldiethoxysilane, N-cyclohexylaminomethyl-trimethoxysilane, N-cyclohexylaminomethyl-methyl-dimethoxysilane; and vinylsilanes such as vinyltrimethoxysilane, vinyltriethoxysilane, vinylmethyl-dimethoxy-, glycidyloxypropyltrimethoxysilane, glycidyloxypropyltriethoxysilane, O-methyl-carbamatomethyl-methyl-dimethoxysilane, O-methyl-carbamatomethyl-trimethoxysilane, O-ethyl-carbamatomethyl-methyldiethoxysilane, O-ethyl-carbamatomethyl-triethoxysilane.

The prepolymers may be safe for handling, have long pot lives, be tailor-made, and/or have high solids content to increase production output.

Although described in connection with solvent-based systems, it should be understood that the prepolymers may also be used in solventless systems.

It should be understood that various aspects of the carboxylic-functionalized system can be applied to the silane-functionalized system and vice versa.

The films of the present disclosure may have a beneficial combination of properties including one or more of the following:
long-term weatherability;
conformability;
printability;

compatibility with adhesives;
clarity and transparency;
chemical resistance; and
coloring/colorability/color properties.

The conformable polyurethane may exhibit one or more of the following properties:
  Young's Modulus greater than about 50 MPa (e.g., >about 200 MPa);
  elongation greater than about 100% (e.g., >about 150%);
  stress relaxation (13%) greater than about 65%;
  draw and necking ration equal to about 1;
  elastic recovery after 24 hours of less than about 100%;
  stress before dwell time (13%) within the range of from about 2 to about 20 MPa (preferably, about 4 to about 15 MPa, more preferably about 6 to about 10 MPa, and even more preferably about 6 to about 8 MPa); and
  multiple glass transition temperature (such as, for example one between about −70° C. to about −20° C., another between about −10° C. to about 20° C., and a third between about 35° C. and about 55° C.

The prepolymer containing solvent-based composition may have a solids content of greater than 40%, greater than 50%, or greater than 60%.

In some embodiments, the solvent-based composition has a viscosity in the range of from about 1,000 to about 50,000 Pa-s, including from about 1,000 to about 20,000 Pa-s.

Optionally, the prepolymer-containing composition further includes at least one additive. In some embodiments, the additive is a pigment, color or colorant, filler, plasticizer, diluent, antioxidant, a UV absorber, a hindered amine light stabilizer, a wetting agent, or a surface modifier, and the like. Pigment, if desired, is provided in an amount sufficient to impart the desired color to the adhesive. Examples of pigments include, without limitation, solid inorganic fillers such as carbon black, titanium dioxide and the like, and organic dyes.

In certain embodiments, a graphic film, comprising: the dried and crosslinked prepolymer-containing composition disclosed herein; an adhesive layer; and an optional release liner.

The graphic film may further comprise a pigment or colorant. The graphic film may further comprise a plasticizer, which may be used to modify the properties of the graphic film. The graphic film may also further comprise at least one additional film layer, for example, wherein the at least one additional film layer provides at least one property selected from the group consisting of antigraffiti, self-healing, coloring, and weathering durability, and combinations thereof. The graphic film may be multilayer (for example, containing the dried and crosslinked prepolymer-containing film layer and at least one second film layer (such as PVDF, acrylic, PVDF/acrylic, and the like) or containing the dried and crosslinked prepolymer-containing film layer with at least one second layer of polyurethane with the same or different composition as the dried and crosslinked prepolymer-containing film layer with an added colorant or pigment (white, color, or metallic, for example)). The multilayered structure may also include a transparent layer.

In some embodiments, a composition of the present disclosure includes 50% to 95% of a polyurethane prepolymer as described herein; and 1% to 50% of at least one other carboxylic- and/or silane-functionalized polymer. Films, coatings, and laminates containing the composition are also disclosed.

The coating may have a thickness in the range of from 1 gsm to 30 gsm. The coat may be deposited on a first surface of a polymeric film. Optionally, an adhesive is applied to a second surface of the polymeric film.

In some embodiments, the coating, polymeric film, and adhesive are layers in a laminate. The laminate may be secured to a substrate via the adhesive. A release liner may be applied to the laminate to cover the adhesive until attachment to the substrate is desired.

In particular embodiments, the compositions of the present disclose a majority proportion (by weight) of the carboxylic- and/or silane-functionalized prepolymer(s). All percentages noted herein are percentages by weight based upon the weight of the composition, unless indicated otherwise. The compositions may also comprise additional polymeric components such as described herein. The compositions may optionally comprise minor amounts of one or more anti-oxidants, UV absorbers, colors or colorants, pigments, plasticizers, and combinations thereof.

In some embodiments, the functionalized prepolymer(s) include block copolymers. In certain versions, the first segment may be a "hard" segment and exhibit a glass transition temperature greater than 25° C., particularly greater than 50° C., and more particularly greater than 75° C. In certain versions, the second segment may be a "soft" segment and exhibit a glass transition temperature less than 25° C., particularly less than 0° C., and more particularly less than −20° C.

Films formed from the compositions may have a thickness of at least 10 microns and, in some embodiments, within a range of from 20 microns to 300 microns. In other embodiments, the films exhibit a thickness greater than 300 microns.

The films can be formed from a wide array of techniques such as but not limited to extrusion and calendaring processes.

The coatings of the present subject matter may have a thickness or coating weight greater than 1 g/m$^2$ (gsm) and typically within a range of from 1 gsm to 30 gsm. However, coatings having thicknesses or coating weights less than 1 gsm or greater than 30 gsm are also disclosed. In certain embodiments, the coatings have a thickness or coating weight in the range of from 5 gsm to 30 gsm.

Coatings of the compositions can be formed using a wide array of techniques. Upon depositing the composition upon a surface of interest, the layer of composition dries, hardens, and/or otherwise cures to form a coating. After deposition of the composition and during or after formation of the coating, one or more post-deposition treatments may be utilized such as exposure to heat.

In some embodiments, in forming the coatings or films, the coatings or films undergo polymerization and/or crosslinking. In certain coatings or films, one or more of the components in the composition undergoes polymerization.

The compositions may exhibit a unique combination of properties obtainable from coatings, films, and coated films of the compositions. Examples of these features include (i) excellent conformability, for example 3D conformability, (ii) good chemical resistance and particularly resistance to gasoline and isopropyl alcohol (IPA), and (iii) good weatherability as described in greater detail herein. In some embodiments, the coatings, films, and coated films using the compositions as noted herein also exhibit good printability or adhesion on an underlying surface or film.

In some embodiments, the coatings, films, and coated films exhibit excellent 3D conformability. The term "conformable" refers to a film or coated film or coated laminate as described herein capable of substantially conforming to an underlying surface to which it is applied so that the exposed surface of the conformable film or laminate film substantially mimics the topology of the underlying surface.

In some embodiments, the conformable and more particularly the 3D conformable films and coated films of the present subject matter may exhibit (i) a residual stress of less than about 1.5 pounds force per inch, and/or (ii) a tensile load at 16% strain of less than 7 pounds force per inch without breakage, and/or stress before dwell time (13%) within the range of from about 2 to about 20 MPa (preferably, about 4 to about 15 MPa, more preferably about 6 to about 10 MPa, and even more preferably about 6 to about 8 MPa). These properties are described in greater detail herein.

The coatings of the present subject matter composition may be applied to a film or other surface, e.g., by extrusion. And so the coatings can, in some applications, be considered a topcoat or overlaminate or outer coating. The underlying film can for example be acrylic, polyvinylidene fluoride (PVDF), polyvinyl chloride (PVC), polyurethane, or polyester. Combinations of these agents are contemplated. In addition, combinations of one or more of these with other agents are contemplated. And as previously noted, compositions can be formed into films. Such films can be combined or used in conjunction with films formed from a wide array of polymers such as those noted herein.

In some embodiments, the film used in combination with a coating or film of the present subject matter composition is a monolayer film.

In other embodiments, the film is a multilayer film. The number of layers can be 2 or more, from 2 to 10, from 2 to 50, and in particular embodiments from 3 to 7. The film can include at least two layers and weight ratio of layers can range from 5% to 95% of a first layer relative to 95% to 5% of a second layer. In certain versions, the film includes at least two layers. In particular versions, one layer includes the prepolymer(s). The second layer contains a second polymer such as an olefin or TPU or PVC. For example, the film can be in the form of a multilayer structure in which one film is a film as described herein, and the second layer is a film that improves the tear strength and conformability of the resulting structure.

The films and/or coated films of the present subject matter may include one or more layers or regions of adhesive. Typically, the adhesive is disposed on a face of the film oppositely directed from the coated face of the film. However, the present subject matter includes other arrangements and configurations for the films and laminates.

The adhesive may be formed from an acrylic based polymer. In some embodiments, the adhesive is a pressure sensitive adhesive (PSA). It is contemplated that any acrylic based polymer capable of forming an adhesive layer with sufficient tack to adhere to a substrate may function in the present subject matter. In certain embodiments, the acrylic polymers for the pressure sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure sensitive adhesive might be formed from a single polymeric species.

A description of useful pressure sensitive adhesives may be found in Encyclopedia of Polymer Science and Engineering, Vol. 13, Wiley-Interscience Publishers (New York, 1988). Additional description of useful PSAs may be found in Polymer Science and Technology, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. In one embodiment, the PSA comprises an acrylic emulsion adhesive.

In addition to tackifiers, other additives may be included in the PSAs to impart desired properties. For example, plasticizers may be included, and they are known to decrease the glass transition temperature of an adhesive composition containing elastomeric polymers. Antioxidants also may be included in the adhesive compositions. Cutting agents such as waxes and surfactants also may be included in the adhesives. Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive layer may be a single layer or comprise multiple layers of adhesive. The multiple layers of adhesive may be applied to the film or laminate simultaneously using methods known in the art.

The release liners that may be utilized in the laminates of the present subject matter can consist of any of a variety of materials known to those of skill in the art to be suitable as release liners. In one embodiment, the release liner comprises a 90# stayflat liner. Other suitable release liners include silicone coated films or polycoated kraft, as are known in the art. Suitable pre-siliconized release liners are available commercially.

The present subject matter includes a variety of laminates that include a coating as described herein and/or a film as described herein in which the coating and/or film includes the noted prepolymer(s) in combination with a further polymer or polymers having carboxylic and/or silane functionality. In certain embodiments, the laminates include coatings of the noted compositions on films with optional adhesive layers. In still other embodiments, the laminates include films of the compositions in combination with one or more other films, with optional adhesive layers.

In particular embodiments, the present subject matter also includes a laminate comprising a plurality of films in which at least one of the films includes (i) from 50% to 95% of the prepolymer(s), and (ii) from 1% to 50% of at least one polymer with carboxylic and/or silane functionality. The remaining film(s) typically include one or more polymeric agents selected from acrylic (i.e., polyacrylate(s)), polyvinyl chloride (PVC), polyurethane, polyester, and combinations thereof. The remaining films can include other polymeric agents in addition to or instead of these noted polymeric agents. In many versions of this laminate, an adhesive layer is provided along a bottom face or underside of the bottom layer. The films of the laminate can be arranged such that the film including the prepolymer(s) constitutes an outer or top film of the laminate. The remaining film(s) are disposed between the top film and the adhesive layer. In certain versions of this laminate, one or more face(s) of the remaining film(s) and particularly the film face immediately adjacent to the film including the prepolymer(s), may include print, text, indicia, and/or adhesive disposed between the noted film face and the film including the prepolymer(s).

The present subject matter also provides systems of one or more substrates and coated films, films, or laminates as described herein, adhered to the substrate(s). The substrates may be vehicle panels. However, it will be understood that the present subject matter is not limited to such and includes a wide array of other substrates, components, and surfaces for use with the compositions, coatings, coated films, laminates, and applications described herein.

The films, coated films and laminates of the present subject matter may find use in graphics applications such as large sheets/panels applied to vehicles or other exterior surface(s).

Figure 14:
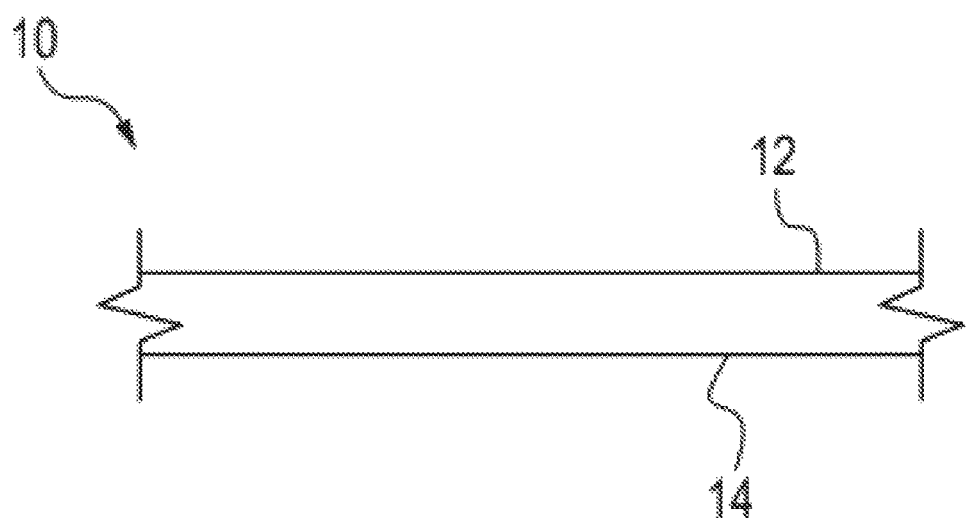
FIG. 14 is a schematic cross sectional view of an embodiment of a coating or a film in accordance with the present subject matter.

FIG. 14 illustrates a coating or film 10 in accordance with an embodiment of the present subject matter. The coating or film includes the compositions described herein. The coating or film 10 defines a first face 12 and an oppositely directed second face 14. For a coating, the first face 12 is typically an outer or exterior face of the coating, and the second face 14 is typically directed toward and/or contacting an underlying film, substrate, or other layer. For a film, the first face 12 and the second face 14 are typically oppositely directed from each other. The term "coating" as used herein refers to the coating of the present composition disposed on and in direct contact with an underlying film, substrate, or other layer. Typically, coatings are initially in a liquid or flowable state; deposited or applied on the underlying film, substrate or other layer; and then cured or otherwise solidified. For applications in which the present composition is formed into a film, the film may be independent from an underlying film, substrate, or other layer. In some embodiments, films of the present subject matter are free standing films. However, the present subject matter includes films formed from the present compositions which are positioned alongside or in conjunction with other films, substrates, or layers.

Figure 15:
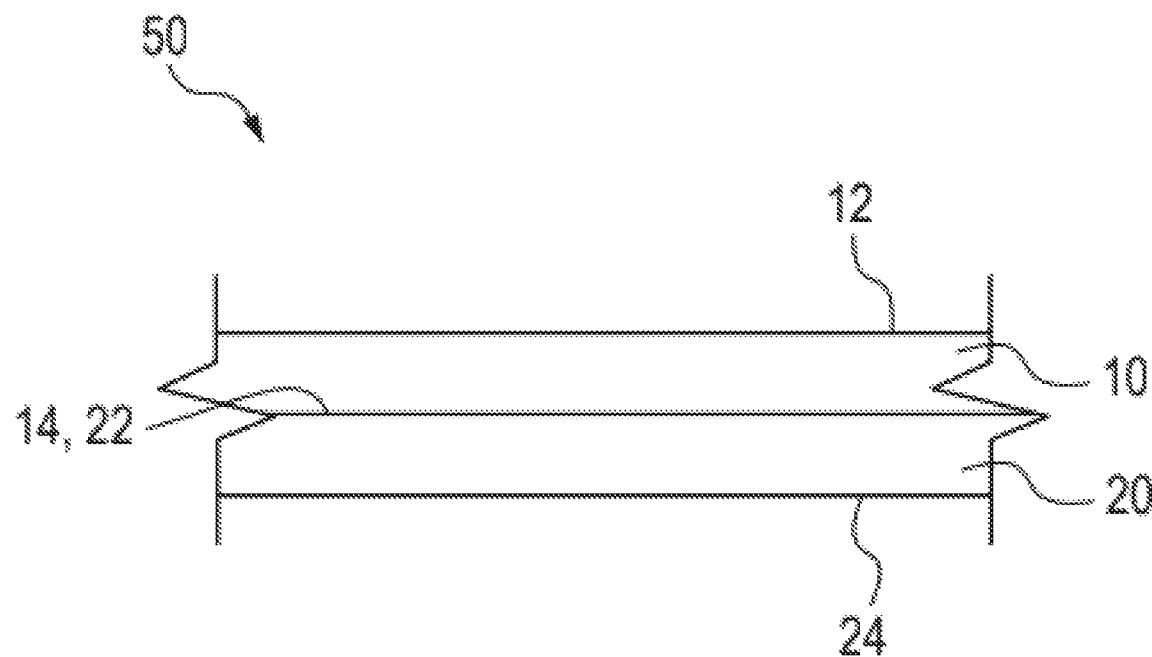
FIG. 15 is a schematic cross sectional view of an embodiment of a film having the coating of FIG. 14 disposed thereon in accordance with the present subject matter.

FIG. 15 illustrates a coated film 50 comprising the coating 10 depicted in FIG. 14 and disposed on a polymeric film 20. The film 20 defines a first face 22 and a second face 24 which is oppositely directed from the first face 22. Typically, the second face 14 of the coating 10 and the first face 22 of the film 20 are in contact with each other.

Figure 16:
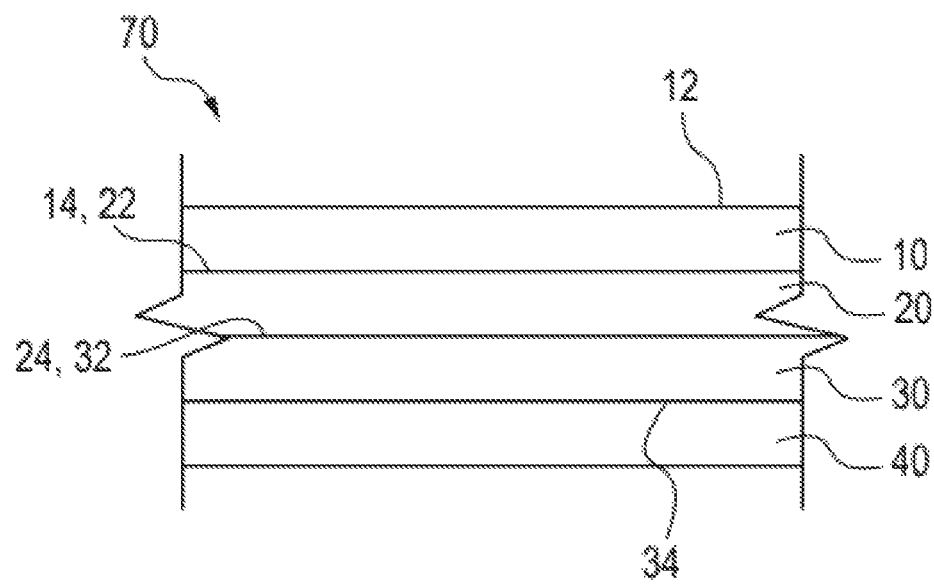
FIG. 16 is a schematic cross sectional view of an embodiment of the coated film depicted in FIG. 15 having a layer of an adhesive and an optional release liner along an underside of the adhesive and coated film in accordance with the present subject matter.

FIG. 16 illustrates a laminate 70 comprising the coated film of FIG. 15 having a layer or region of adhesive 30 disposed thereon. Typically, a layer or region of adhesive 30 is on the second face 24 of the film 20. More specifically, the layer of adhesive 30 defines a first face 32 and an oppositely directed second face 34. Typically, the first face 32 of the adhesive 30 contacts the second face 24 of the film 20. In certain embodiments, the laminate 70 may optionally include a release liner 40 at least partially covering the adhesive 30 and more particularly the second face 34 of the adhesive 30.

Figure 17:
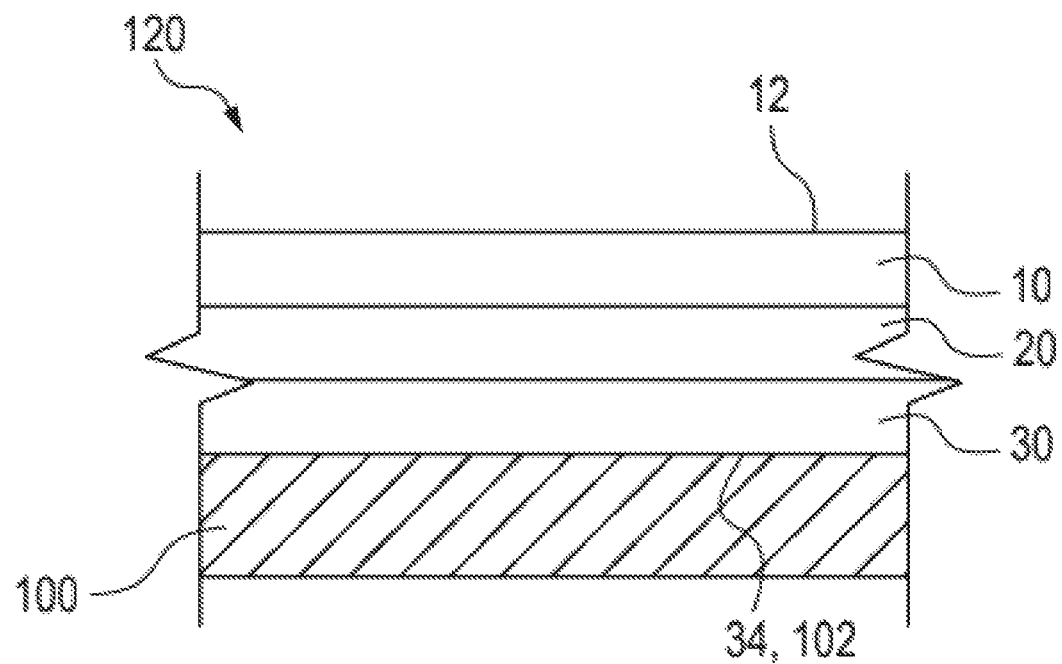
FIG. 17 is a schematic cross sectional view of an embodiment of the coated film of FIG. 16 and layer of adhesive, applied to a typical substrate in accordance with the present subject matter.

FIG. 17 illustrates a system 120 comprising a substrate 100 having an outer surface 102. The system 120 also comprises the laminate 70 of FIG. 16 free of release liner(s) 40, in which the adhesive 30 is contacted with the outer surface 102 of the substrate 100. As will be understood, typically, the second face 34 of the adhesive 30 is disposed on and contacting the outer surface 102 of the substrate 100. Non-limiting examples of the substrate 100 include a vehicle panel or body member, sign, banner substrate, building member or other component.

Figure 18:
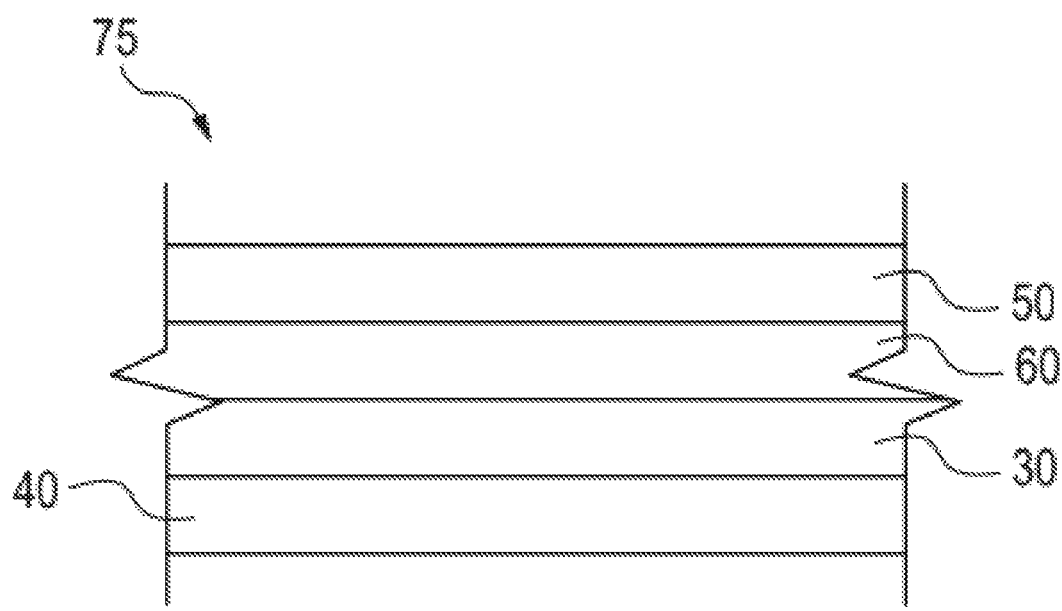
FIG. 18 is a schematic cross sectional view of an embodiment of a laminate in accordance with the present subject matter.

FIG. 18 illustrates a laminate 75 comprising a first film 50 and a second film 60. The first film 50 is formed from the present subject matter composition as described herein. The second film can be selected from a wide array of polymeric materials such as but not limited to acrylic, polyvinyl chloride (PVC), polyurethane, polyester, and combinations thereof. The laminate 75 can include a layer or region of adhesive 30. Although the laminate is depicted as utilizing the second film 60 disposed between the first film 50 and adhesive 30, it will be understood that the present subject matter includes other arrangements. An optional release liner 40 can be provided.

Figure 19:
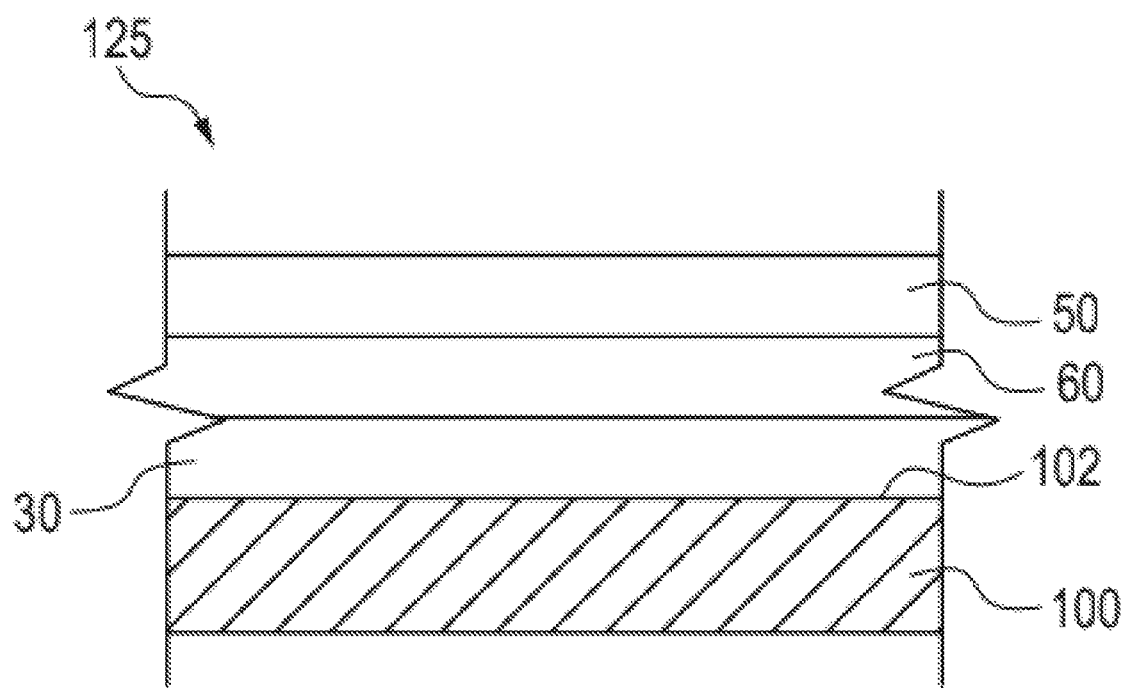
FIG. 19 is a schematic cross sectional view of the laminate of FIG. 18 applied to a typical substrate.

FIG. 19 illustrates a system 125 comprising the substrate 100 having the noted outer surface 102. The system 125 also comprises the laminate 75 of FIG. 18 free of release liner(s) 40, in which the adhesive is contacted with the outer surface 102 of the substrate 100.

In some embodiments, conformable films and coated films of the present subject matter exhibit a residual stress of less than 1.5 pounds force per inch, and in certain versions less than 1.0 pound per inch.

Residual stress is a measurement of the extent to which a film will retain or dissipate tensile force induced during a tensile test. The measurement evaluates the extent of relaxation of the film after the film is stretched 13% for 12 minutes.

Residual stress is measured as follows. Film samples having a width of 1 inch, length of 8 inches, and thickness as described herein, are placed in a tensile tester at a gauge length of 4 inches. An Instron constant rate of elongation tensile tester Model 3345 can be used. The tensile tester is operated at a crosshead speed of 4 in/min (66.7%/min) until the strain reaches 13% at which point the crosshead is stopped and the sample is held at 13% strain for 12 minutes. The load during this hold time is measured and the value at 12 minutes is recorded. After 12 minutes the sample is returned to the original gauge length.

In some embodiments, conformable films of the present subject matter exhibit a tensile load, prior to breakage, of less than 6 pounds force per inch and in certain embodiments of less 7 pounds force per inch.

Tensile load is the tensile load at 16% strain, prior to breakage.

Tensile load is measured as follows. Film samples having a width of 1 inch are placed in a tensile tester at a gauge length of 2 inches. The tensile tester is operated at a crosshead speed of 5 in/min (250%/min) until the sample fails. A tensile testing instrument from MTS Systems and Sintech, which is a computerized robotic material testing system can be used. The thickness of the film samples is described herein.

In some embodiments, the coatings and films of the present subject matter exhibit resistance to exposure to gasoline. Resistance to gasoline assesses degradation of coated films after immersion in gasoline. Generally, coated film samples having dimensions of 1 inch by 4 inches and thicknesses are immersed in gasoline (87 or 89 octane). Two to three film samples are immersed for a designated time period which is either 15, 30, or 60 minutes. After immersion, the film samples are air dried and evaluated for degradation or detrimental effects such as shrinkage or poor aesthetic appearance. If no such degradation is evident, the samples are designated as resistant to exposure to gasoline. Films and coated films as described herein are resistant to exposure to gasoline.

In some embodiments, the coatings and films of the present subject matter exhibit resistance to exposure to IPA. Resistance to isopropyl alcohol (IPA) assesses degradation of films after immersion in IPA. Baseline color and gloss measures of film samples prior to IPA exposure are obtained. Coated film samples of 1 inch by 4 inches are wiped with IPA in one direction 10 times and then allowed to dry for at least two minutes. Color and gloss measurements are then taken. Wiping, drying, and measurements are repeated. After a total of four cycles or wiping sample(s) a total of 40 times, final color and gloss measurements are taken. If no substantial changes occur, i.e., more than 5%, of the color and gloss, the films are designated as resistant to exposure to IPA. Films and coated films as described herein are resistant to exposure to IPA.

In some embodiments, films and coatings of the present subject matter exhibit resistance to mild alkali agents and acid, and automotive fluids such as windshield wiper fluid and oil for example. Resistance to multiple agents is exhibited for certain embodiments.

In some embodiments, conformable films and coated films of the present subject matter exhibit weatherability or resistance to certain environmental factors.

Weatherability as described herein indicates resistance to certain environmental factors such as exposure to water and sunlight. Weatherability is assessed and performed according to ASTM D7869-13.

Many other benefits will no doubt become apparent from future application and development of this technology.

Although the disclosure is focused on polyurethane prepolymers, it should be understood that other carboxylic- and/or silane-functionalized prepolymers are also contemplated. Compositions, films, coatings, laminates, and systems with prepolymers for polymers other than polyurethanes are also disclosed.

Also disclosed are compositions containing prepolymers with carboxylic and/or silane functionality in combination with at least one polyurethane.

In some embodiments, the prepolymer(s) can be water-dispersed and applied from water.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

A reactor was equipped with a mechanical stirrer, cooler with circulating water, thermometer, input of nitrogen with valve, and flowbubbler (on top of cooler) to measure the nitrogen flow.

To prepare the prepolymer the following components were reacted:

| Component | Level |
| --- | --- |
| Oxymer HD112 soft polycarbonate diol (Mw = 1000) | 25.0 g (0.0500 eq) Note: 25% in equivalent can be substituted with 25% equivalent of 1,4-butanediol |
| DMPA dimethylolpropionic acid (carboxylic acid glycol; Mw = 134) | 5.13 g (0.0750 eq) |
| H12MDI dicyclohexylmethane-4,4'-diisocyanate (Mw = 262.4) | 12.30 g (0.0938 eq) |
| Isophorone di-isocyanate (IPDI) (Mw = 222.3) | 10.42 g (0.0938 eq) |
| Irganox 1010 antioxidant (500 ppm) | 0.03 g |
| TIB-Kat catalyst (1000 ppm) | 0.05 G |
| Proglyde DMM dipropylene glycol dimethyl ether solvent | 5.29 g (10%) |

Note:
In case of dilution with ethyl acetate, DMM needs to be increased to 20%

To endcap the prepolymer the following components were reacted:

| Component | Level |
| --- | --- |
| 2-ethyl-1-hexanol (Mw = 130.2) | 8.65 g (0.0664 eq) (105) |
| Toluene | 47.6 g (90%) |

Note:
Alternatively, ethyl acetate can be used.

Theoretical solid content=50%

Endcapping is done with a monoalcohol.

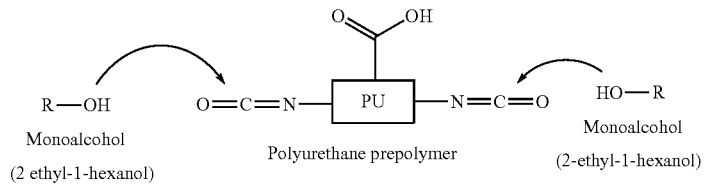

R—OH
Monoalcohol
(2 ethyl-1-hexanol)

Polyurethane prepolymer

HO—R
Monoalcohol
(2-ethyl-1-hexanol)

To crosslink the endcapped prepolymer, the following components were reacted:

| Component | Level |
| --- | --- |
| Triethylamine (TEA; Mw = 101.2) | 4.6 g (0.05 eq) (120%) |
| CX-100 trimethylolpropane tris(2-methyl-1-aziridinepropionate crosslinker; (Mw = 467.6) | 6.0 g (0.0383 eq) (100%) |

Amount of yield=±91.5 g

[Chemical structure diagram showing Polyurethane (PU) with carboxyl group reacting with TEA, and CX100 crosslinker structure with three aziridine groups]

Polyurethane

CX100

The following chemicals were weighed and added to a reactor:
25.0 g (0.0500 eq) Oxymer HD112
5.13 g (0.0750 eq) DMPA
0.03 g Irganox 1010
0.05 g TIB-KAT 716.

The oil bath heater was set to 90° C. to melt the mixture. This mixture was stirred at low speed (30 rpm) with heat until the HD112 melted at an internal temperature of 80° C. and torque of 2-5 Ncm. At this stage both diisocyanates (H12MD1 (12.30 g; 0.0938 eq) and IPDI (10.42 g; 0.0938 eq)) were added.

An exothermic reaction took place with an increment of T=15-45 minutes and the torque changed from about 8-20 Ncm. The reaction was kept at about 85° C. for about 3 hours and followed by FT-IR to see if the right functional groups were reacting until the NCO peak (2230 cm$^{-1}$) was stable.

The endcapping stage was obtained adding a monoalcohol or monoamine (in most cases it was 2-ethyl-1-hexanol (105%; 8.65 g; 0.0664 eq)). This reaction continued until the NCO peak was completely gone (determined by IR at 2230 cm-1), which was usually after about 2 hours.

If at any point the torque rose above 20 Ncm, 4-8 ml of toluene were added. This lowered the torque to about 10Ncm and the reaction temperature by about 4° C.

The polyurethane (PU) product was diluted in 47.6 g of toluene (for solid content of 50%).

The solution was cooled to 50° C. and 4.6 g 0.05 eq (120%) of TEA were added. The final solution (hazy in appearance) was downloaded from the reactor and checked for:
Solid content (about 5 hours at 90° C.; no vacuum),
FT-IR (disappearance of peak at 2230 cm$^{-1}$)
Viscosity shear rate sweep.

To the solution, 6.0 g CX-100 crosslinker were added and stirred for 5 minutes to fully homogenize the mixture and it is left for a day to get all the air bubbles out.

A day later the mixture was cast onto siliconized polyethylene terephthalate (PET) and heated an oven for 3 minutes at 90° C., 2 minutes at 130° C. and 2 minutes at 150° C. If the first sheet was not completely dry, an extra minute at 150° C. was added. After this the samples were analyzed for mechanical properties among other tests. All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A composition for producing a polyurethane comprising:
a prepolymer comprising carboxyl groups; and
a solvent, wherein the prepolymer and solvent together have a viscosity in the range of from about 1,000 to about 50,000 Pa-s; and
a polyaziridine compound;
wherein the composition is free of isocyanates and the composition has an elongation greater than about 100% and less than about 150%.

2. The composition of claim 1, having a solids content of at least 40%.

3. The composition of claim 1, having a solids content of at least 50%.

4. The composition of claim 1, wherein the carboxyl groups are end groups.

5. The composition of claim 1, wherein the carboxyl groups are not end groups.

6. The composition of claim 1, wherein the polyurethane is an aliphatic polyurethane.

7. The composition of claim 1, wherein the prepolymer comprises a plurality of silane moieties.

8. A graphic film, comprising:
the composition of claim 1 that is dried and crosslinked;
an adhesive layer; and
an optional release liner.

9. The graphic film of claim 8, further comprising:
pigment or colorant.

10. The graphic film of claim 8, further comprising:
a plasticizer.

11. The graphic film of claim 8, further comprising:
at least one additional film layer.

12. The graphic film of claim 11,
wherein the at least one additional film layer provides at least one property selected from the group consisting of antigraffiti, self-healing, coloring, and weathering durability.

* * * * *